US012451042B2

(12) United States Patent
Chen et al.

(10) Patent No.: US 12,451,042 B2
(45) Date of Patent: Oct. 21, 2025

(54) METHOD FOR DRIVING DISPLAY PANEL, DRIVER CIRCUIT FOR DISPLAY PANEL, AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Peng Chen, Beijing (CN); Zhicai Xu, Beijing (CN); Shaoning Liu, Beijing (CN); Jie Yang, Beijing (CN); Suncun Li, Beijing (CN); Shiming Li, Beijing (CN); Lixia Shen, Beijing (CN); Eunho Lee, Beijing (CN)

(73) Assignees: CHENGDU BOE OPTOELECTRONICS TECHNOLOGY CO., LTD., Sichuan (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/273,784

(22) PCT Filed: Sep. 29, 2022

(86) PCT No.: PCT/CN2022/122568
§ 371 (c)(1),
(2) Date: Jul. 24, 2023

(87) PCT Pub. No.: WO2024/065392
PCT Pub. Date: Apr. 4, 2024

(65) Prior Publication Data
US 2024/0404447 A1 Dec. 5, 2024

(51) Int. Cl.
*G09G 3/20* (2006.01)

(52) U.S. Cl.
CPC ......... *G09G 3/2007* (2013.01); *G09G 3/2092* (2013.01); *G09G 2320/0233* (2013.01);
(Continued)

(58) Field of Classification Search
None
See application file for complete search history.

(56) References Cited

U.S. PATENT DOCUMENTS

2013/0147864 A1* 6/2013 Kim .................... G09G 3/3607 345/88
2014/0285535 A1 9/2014 Pyo
(Continued)

FOREIGN PATENT DOCUMENTS

CN 103310752 A 9/2013
CN 107665666 A 2/2018
(Continued)

*Primary Examiner* — Benjamin C Lee
*Assistant Examiner* — Nathan P Brittingham
(74) *Attorney, Agent, or Firm* — XSENSUS LLP

(57) ABSTRACT

Provided is a method for driving a display panel, including: acquiring gamma correction data of each of the display blocks; for each pixel in the display panel, determining, based on the gamma correction data of a first display block where the pixel is located, a first correction voltage corresponding to a to-be-displayed target gray scale of the pixel; determining, based on the gamma correction data of at least one second display block adjacent to the first display block, at least one second correction voltage corresponding to the target gray scale; determining a gamma voltage of the pixel based on the first correction voltage, the at least one second correction voltage, and a position of the pixel in the display panel; and driving, based on the gamma voltage, the pixel to display the target gray scale.

19 Claims, 8 Drawing Sheets

(52) U.S. Cl.
CPC ............... *G09G 2320/0276* (2013.01); *G09G 2320/0686* (2013.01)

(56) References Cited

U.S. PATENT DOCUMENTS

| | | | | |
|---|---|---|---|---|
| 2016/0196793 | A1 | 7/2016 | Xu | |
| 2019/0130844 | A1 | 5/2019 | Yang et al. | |
| 2021/0366392 | A1* | 11/2021 | Hong | G09G 3/3233 |
| 2022/0198977 | A1 | 6/2022 | Kim et al. | |
| 2022/0208942 | A1 | 6/2022 | Yu | |
| 2022/0262305 | A1* | 8/2022 | Chun | G09G 5/10 |
| 2023/0064991 | A1* | 3/2023 | Hu | G09G 3/2007 |

FOREIGN PATENT DOCUMENTS

| | | | | |
|---|---|---|---|---|
| CN | 109064994 | A | 12/2018 | |
| CN | 112951170 | A | 6/2021 | |
| CN | 113948041 | A | 1/2022 | |
| CN | 114038399 | A * | 2/2022 | G09G 3/32 |
| CN | 114648931 | A | 6/2022 | |
| KR | 2015-0048602 | A | 5/2015 | |
| WO | 2022/134015 | A1 | 6/2022 | |

* cited by examiner

| | | | |
|---|---|---|---|
| block1 | Gamma_R1 | Gamma_G1 | Gamma_B1 |
| block2 | Gamma_R2 | Gamma_G2 | Gamma_B2 |
| block3 | Gamma_R3 | Gamma_G3 | Gamma_B3 |
| block4 | Gamma_R4 | Gamma_G4 | Gamma_B4 |
| block5 | Gamma_R5 | Gamma_G5 | Gamma_B5 |
| block6 | Gamma_R6 | Gamma_G6 | Gamma_B6 |
| block7 | Gamma_R7 | Gamma_G7 | Gamma_B7 |
| block8 | Gamma_R8 | Gamma_G8 | Gamma_B8 |
| block9 | Gamma_R9 | Gamma_G9 | Gamma_B9 |

| DBV/gray | 0 | 4 | ~ | 512 | 516 | ~ | 1020 | 1023 |
|---|---|---|---|---|---|---|---|---|
| DBV_0 | Gamma (0,0) | Gamma (0,4) | ~ | Gamma (0,512) | Gamma (0,516) | ~ | Gamma (0,1020) | Gamma (0,1023) |
| DBV_255 | Gamma (255,0) | Gamma (255,4) | ~ | Gamma (255,512) | Gamma (255,516) | ~ | Gamma (255,1020) | Gamma (255,1023) |
| DBV_768 | Gamma (768,0) | Gamma (768,4) | ~ | Gamma (768,512) | Gamma (768,516) | ~ | Gamma (768,1020) | Gamma (768,1023) |
| DBV_1023 | Gamma (1023,0) | Gamma (1023,4) | ~ | Gamma (1023,512) | Gamma (1023,516) | ~ | Gamma (1023,1020) | Gamma (1023,1023) |
| DBV_1535 | Gamma (1535,0) | Gamma (1535,4) | ~ | Gamma (1535,512) | Gamma (1535,516) | ~ | Gamma (1535,1020) | Gamma (1535,1023) |
| DBV_2047 | Gamma (2047,0) | Gamma (2047,4) | ~ | Gamma (2047,512) | Gamma (2047,516) | ~ | Gamma (2047,1020) | Gamma (2047,1023) |
| DBV_2559 | Gamma (2559,0) | Gamma (2559,4) | ~ | Gamma (2559,512) | Gamma (2559,516) | ~ | Gamma (2559,1020) | Gamma (2559,1023) |
| DBV_3071 | Gamma (3071,0) | Gamma (3071,4) | ~ | Gamma (3071,512) | Gamma (3071,516) | ~ | Gamma (3071,1020) | Gamma (3071,1023) |
| DBV_3583 | Gamma (3583,0) | Gamma (3583,4) | ~ | Gamma (3583,512) | Gamma (3583,516) | ~ | Gamma (3583,1020) | Gamma (3583,1023) |
| DBV_4095 | Gamma (4095,0) | Gamma (4095,4) | ~ | Gamma (4095,512) | Gamma (4095,516) | ~ | Gamma (4095,1020) | Gamma (4095,1023) |

FIG. 9

METHOD FOR DRIVING DISPLAY PANEL, DRIVER CIRCUIT FOR DISPLAY PANEL, AND DISPLAY DEVICE

CROSS-REFERENCE TO RELATED APPLICATION

This application is a U.S. national stage of international application No. PCT/CN2022/122568, filed on Sep. 29, 2022, the disclosure of which is incorporated herein by reference in its entireties.

TECHNICAL FIELD

The present disclosure relates to the field of display technologies, and in particular, to a method for driving a display panel, a driver circuit for a display panel, and a display device.

BACKGROUND

A display apparatus generally includes a display panel and a driver circuit. The driver circuit is connected to a plurality of pixels in the display panel through wires, and provides driving signals for the plurality of pixels, such that the plurality of pixels is driven to emit light.

For display panels of medium and large sizes (for example, greater than 10 inches), as wires between pixels of different regions of the display panel and a driver circuit are greatly different in length, voltages of the driving signals received by the pixels in different regions are different.

SUMMARY

The present disclosure provides a method for driving a display panel, a driver circuit for a display panel, and a display device. The technical solutions are as follows:

In one aspect, a method for driving a display panel is provided. The display panel includes a plurality of display blocks. The method for driving the display panel includes:

acquiring gamma correction data of each of the display blocks, wherein the gamma correction data of the plurality of display blocks is acquired by performing gamma correction on at least one of the plurality of display blocks;

for each pixel in the display panel, determining, based on the gamma correction data of a first display block where the pixel is located, a first correction voltage corresponding to a to-be-displayed target gray scale of the pixel;

determining, based on the gamma correction data of at least one second display block adjacent to the first display block, at least one second correction voltage corresponding to the target gray scale;

determining a gamma voltage of the pixel based on the first correction voltage, the at least one second correction voltage, and a position of the pixel in the display panel; and driving, based on the gamma voltage, the pixel to display the target gray scale.

In another aspect, a driver circuit for a display panel is provided. The display panel includes a plurality of display blocks; the driver circuit includes a timing control circuit and the source driving module;

the timing control circuit is configured to: acquire gamma correction data of each of the display blocks, wherein the gamma correction data of the plurality of display blocks is acquired by performing gamma correction on at least one of the plurality of display blocks;

for each pixel in the display panel, determine, based on the gamma correction data of a first display block where the pixel is located, a first correction voltage corresponding to a to-be-displayed target gray scale of the pixel;

determine, based on the gamma correction data of at least one second display block adjacent to the first display block, at least one second correction voltage corresponding to the target gray scale;

determine a gamma voltage of the pixel based on the first correction voltage, the at least one second correction voltage, and a position of the pixel in the display panel, and send the gamma voltage of the pixel to the source driving module; and the source driving module is configured to drive, based on the gamma voltage, the pixel to display the target gray scale.

In still another aspect, a driver circuit for a display panel is provided. The driver circuit includes: a memory, a processor, and a computer program stored on the memory and executable on the processor; wherein the processor, when executing the computer program, is caused to perform the above method for driving the display panel.

In yet another aspect, a display device is provided. The display device includes: a display panel, and the above driver circuit for the display panel.

In yet still another aspect, a non-transitory computer readable storage medium is provided. Instructions are stored in the computer readable storage medium. The computer program, when loaded and executed by a processor, cause the processor to perform the above method for driving a display panel.

In a further aspect, a computer program product including an instruction is provided. When the computer program product is run on the computer, the computer is caused to perform the above method for driving a display panel.

BRIEF DESCRIPTION OF THE DRAWINGS

For clearer descriptions of the technical solutions according to the embodiments of the present disclosure, the drawings required to be used in the description of the embodiments are briefly introduced below. It is obvious that the drawings in the description below are only some embodiments of the present disclosure, and it is obvious for those skilled in the art that other drawings can be acquired according to the drawings without creative efforts.

FIG. 9 is a schematic diagram of an LUT of a display block according to some embodiments of the present disclosure;

DETAILED DESCRIPTION

For clearer descriptions of the objects, technical solutions, and advantages of the present disclosure, the embodiments of the present disclosure are further described in detail below with reference to the drawings.

For display panels of medium and large sizes, as wires between pixels of different regions of the display panel and a driver circuit are greatly different in length, and lengths of the wires affect resistances of the wires, the resistances of the wires connected to the driver circuit and the pixels of the different regions are greatly different. As a driving signal provided by the driver circuit usually has an IR drop due to the resistances of a wire upon the driving signal is transmitted by the wire, the IR drop generated by the wires connected to the driver circuit and the pixels of different regions are different. As a result, a large difference exists in voltages of driving signals actually received by the pixels in different regions, that is, a large difference exists in loading states of different regions of the display panel, such that low uniformity of the display brightness of the display panel is caused. In addition, under low gray scale and low brightness, the uniformity of the display brightness of the display panel is further low due to a large difference in charging time of the pixels of different regions or due to crosstalk of other signals.

In some practices, a pixel (for example, a central pixel) in the display panel is selected, and gamma correction, namely, gamma tuning, is performed on the display panel based on the luminance (and chromaticity) of the pixel, such that the problem of non-uniformity of brightness of the display panel is reduced. For example, a gray scale changes from 255 to 0. Default gamma voltages corresponding to various gray scales are adjusted based on the luminance of the pixel at different gray scales, such that in the case that the pixel is driven by an adjusted gamma voltage, the actual luminance of the pixel is equal to ideal luminance, and the chromaticity also meets the requirement. The ideal luminance is determined based on a to-be-displayed gray scale of the pixel. The default gamma voltages are pre-stored.

However, as large difference exists in the loading states of different regions (for example, an edge region and a central region) of the display panels of medium and large sizes, the gamma correction is performed only based on one pixel in the display panel, which only ensures that the brightness of a target region where the pixel is located is uniform, and the brightness of other regions in the display panel except the target region is still greatly different.

Figure 1:
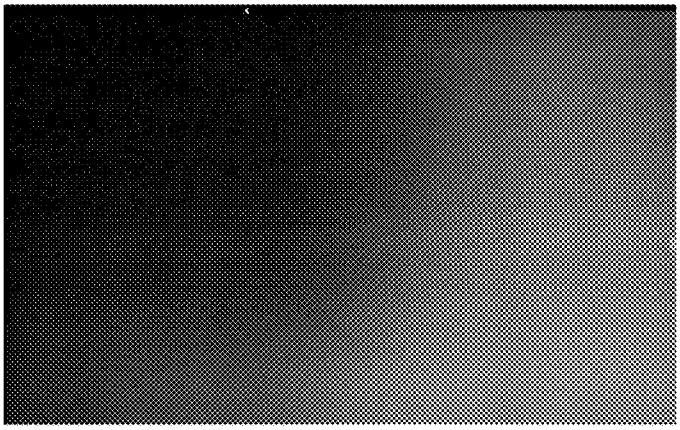
FIG. 1 is a schematic diagram of a displaying effect of a display panel in some practices.

For example, referring to FIG. 1, FIG. 1 is a schematic diagram of a displaying effect of a display panel upon gamma correction is performed on the display panel by using a method in some practices. As is seen from FIG. 1, display brightness of different regions of the display panel is different. Therefore, the method in some practices has a poor effect of improving the display brightness of the display panel.

Figure 2:
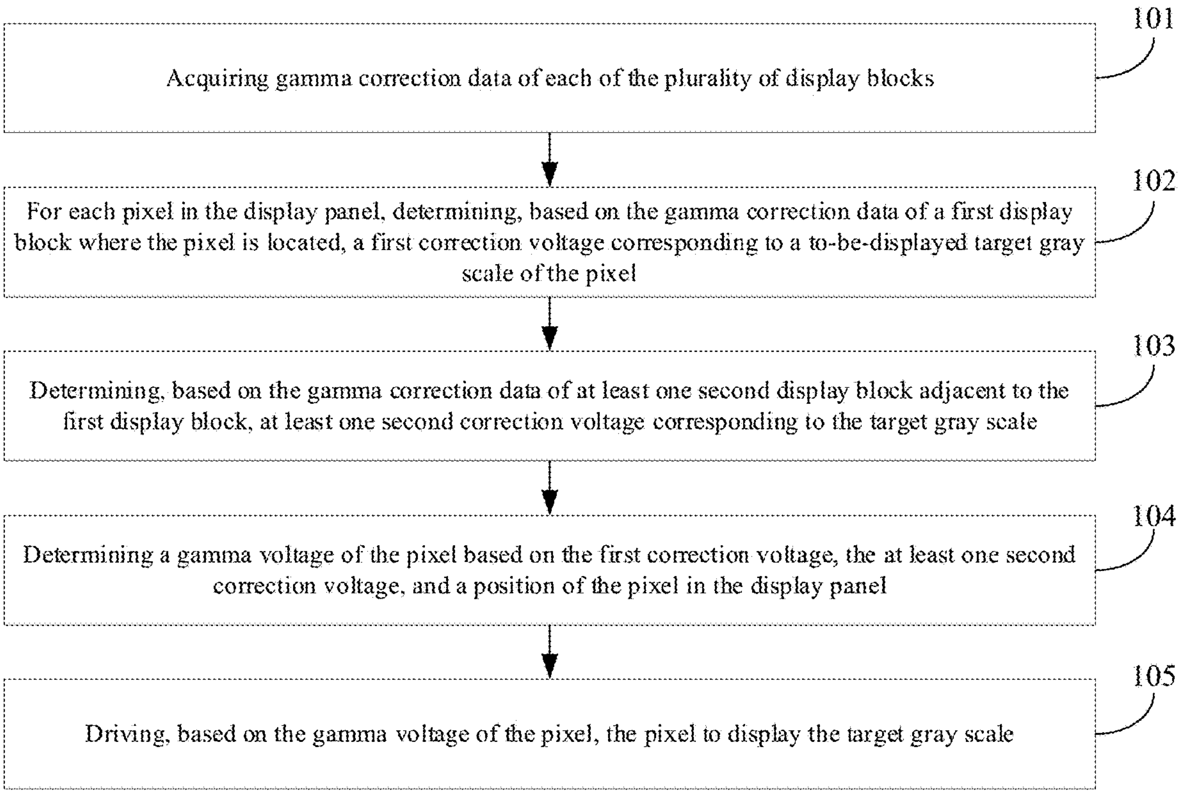
FIG. 2 is a flowchart of a method for driving a display panel according to some embodiments of the present disclosure.

The embodiments of the present disclosure provide a method for driving a display panel. The method is applicable to a driver circuit for the display panel. The display panel includes a plurality of display blocks. Referring to FIG. 2, the method includes the following steps.

In 101, gamma correction data of each of the plurality of display blocks is acquired, wherein the gamma correction data of the plurality of display blocks is acquired by performing gamma correction on at least one of the plurality of display blocks. For example, the gamma correction data of the plurality of display blocks is acquired by gamma correction of each of the plurality of display blocks. Or, the gamma correction data of the plurality of display blocks is acquired upon performing gamma correction on a target display block in the plurality of display blocks. The target display block is any one of the plurality of display blocks.

In the embodiments of the present disclosure, the gamma correction data of each of the plurality of display blocks is a voltage correspondence relationship between a gray scale of the display block and a gamma voltage of the display block. Or, the gamma correction data of the target display block in the plurality of display blocks is a voltage correspondence relationship between a gray scale of the target display block and a gamma voltage of the target display block, and an offset correspondence relationship between a gray scale and a voltage offset. The gamma correction data of each of other display blocks in the plurality of display blocks except the target display block is an offset correspondence relationship between a gray scale of the display block and a voltage offset of the display block. The voltage offset corresponding to any gray scale in the offset correspondence relationship is an offset relative to the gamma voltage corresponding to any gray scale in the voltage correspondence relationship of the target display block.

In 102, for each pixel in the display panel, a first correction voltage corresponding to a to-be-displayed target gray scale of the pixel is determined based on the gamma correction data of a first display block where the pixel is located.

In the embodiments of the present disclosure, for each pixel (hereinafter referred to as a target pixel for convenience of description) in the display panel, the driver circuit determines, based on a position of the target pixel in the display panel and positions of the plurality of display blocks in the display panel, the first display block where the target pixel is located. Later, the driver circuit determines a first correction voltage corresponding to the target gray scale based on the to-be-displayed target gray scale of the target pixel and the gamma correction data of the first display block.

It is understood that in the case that the gamma correction data of each of the display blocks is the voltage correspondence relationship of the display block, the first correction voltage determined by the driver circuit based on the gamma correction data of the first display block and corresponding to the target gray scale is a first gamma voltage corresponding to the target gray scale.

In the case that the gamma correction data of the target display block in the plurality of display blocks is the voltage correspondence relationship of the target display block, and the offset correspondence relationship, and the gamma correction data of the other display blocks is the offset correspondence relationship of the other display blocks, the first correction voltage determined by the driver circuit based on the gamma correction data of the first display block and corresponding to the target gray scale is a first voltage offset corresponding to the target gray scale.

In 103, at least one second correction voltage corresponding to the target gray scale is determined based on the gamma correction data of at least one second display block adjacent to the first display block.

The driver circuit determines the at least one second display block based on positions of the plurality of display blocks in the display panel and a position of the first display block, wherein each of the second display blocks is adjacent to the first display block. Later, for each of the at least one second display block, the driver circuit determines a second correction voltage corresponding to the target gray scale based on the to-be-displayed target gray scale of the target pixel and the gamma correction data of the second display block.

It is understood that in the case that the gamma correction data of each of the display blocks is the voltage correspondence relationship of the display block, the second correction voltage corresponding to the target gray scale is the second gamma voltage corresponding to the target gray scale. In the case that the gamma correction data of the target display block among the plurality of display blocks is the voltage correspondence relationship of the target display block, and the offset correspondence relationship, and the gamma correction data of the other display blocks is the offset correspondence relationship of the other display blocks, each second correction voltage corresponding to the target gray scale is a second voltage offset corresponding to the target gray scale.

In 104, a gamma voltage of the pixel is determined based on the first correction voltage, the at least one second correction voltage, and a position of the pixel in the display panel.

In the embodiments of the present disclosure, in the case that each of the first correction voltage and the at least one second correction voltage is a gamma voltage corresponding to the target gray scale, the driver circuit acquires the gamma voltage of the target pixel directly based on the first correction voltage, the at least one second correction voltage, and the position of the target pixel in the display panel.

In the case that each of the first correction voltage and the at least one second correction voltage is a voltage offset corresponding to the target gray scale, the driver circuit first determines the voltage offset of the target pixel based on the first correction voltage, the at least one second correction voltage, and the position of the target pixel. Later, the driver circuit determines the gamma voltage of the target pixel based on the voltage offset of the target pixel and the gamma voltage corresponding to the target gray scale in the voltage correspondence relationship of the target display block. For example, the gamma voltage of the target pixel is a sum of the voltage offset of the target pixel and the gamma voltage.

In the embodiments of the present disclosure, the driver circuit first acquires a mapping relationship between correction voltages and positions of pixels by processing the first correction voltage, the at least one second correction voltage, a position of a central pixel of the first display block in the display panel, and a position of a central pixel of each of the second display blocks in the display panel based on a linear difference algorithm. Then, the driver circuit determines a target gamma voltage of the target pixel based on the position of the target pixel in the display panel and the mapping relationship.

Or, a voltage determining model is pre-stored in the driver circuit. The driver circuit acquires the gamma voltage of the target pixel by inputting the first correction voltage, the at least one second correction voltage, and the position of the target pixel in the display panel to the voltage determining model. The voltage determining model is acquired by pre-training based on a plurality of groups of sample data. Each group of the sample data includes: a sample voltage of a sample pixel in a sample panel, a first sample voltage determined based on gamma correction data of a first sample block where the sample pixel is located, at least one second sample voltage determined based on gamma correction data of at least one second sample block, and a position of the sample pixel in the sample panel. Each of the second sample blocks is adjacent to the first sample block. The sample voltages are sample gamma voltages or sample voltage offsets.

It is understood that the voltage determining model includes a first voltage determining submodel and a second voltage determining submodel. The first voltage determining submodel is trained based on the sample gamma voltage, and the second voltage determining submodel is trained based on the sample voltage offset. In the case that the first correction voltage and the second correction voltage are both gamma voltages, the driver circuit acquires the gamma voltage of the target pixel by using the first voltage determining submodel to process the first correction voltage and the second correction voltage. In the case that the first correction voltage and the second correction voltage are both voltage offsets, the driver circuit acquires the gamma voltage of the target pixel by using the second voltage determining submodel to process the first correction voltage and the second correction voltage.

In 105, the pixel is driven based on the gamma voltage of the pixel to display the target gray scale.

Upon acquiring the gamma voltage of the target pixel, the driver circuit generates a driving signal based on the target gamma voltage to drive the target pixel to display the target gray scale.

In summary, the embodiments of the present disclosure provide a method for driving a display panel. The driver circuit acquires gamma correction data of each of a plurality of display blocks, and the gamma correction data of the plurality of display blocks is acquired by performing gamma correction on at least one display block, such that the display panel is driven based on the gamma correction data of the various display blocks, and brightness of the display panel is ensured to be uniform.

Furthermore, a gamma voltage of each pixel is determined based on a position of the pixel, a first correction voltage, and a second correction voltage, such that luminance of adjacent pixels in a displaying process is ensured to be smoothly transitioned, and a relatively good displaying effect of the display panel is ensured.

Figure 3:
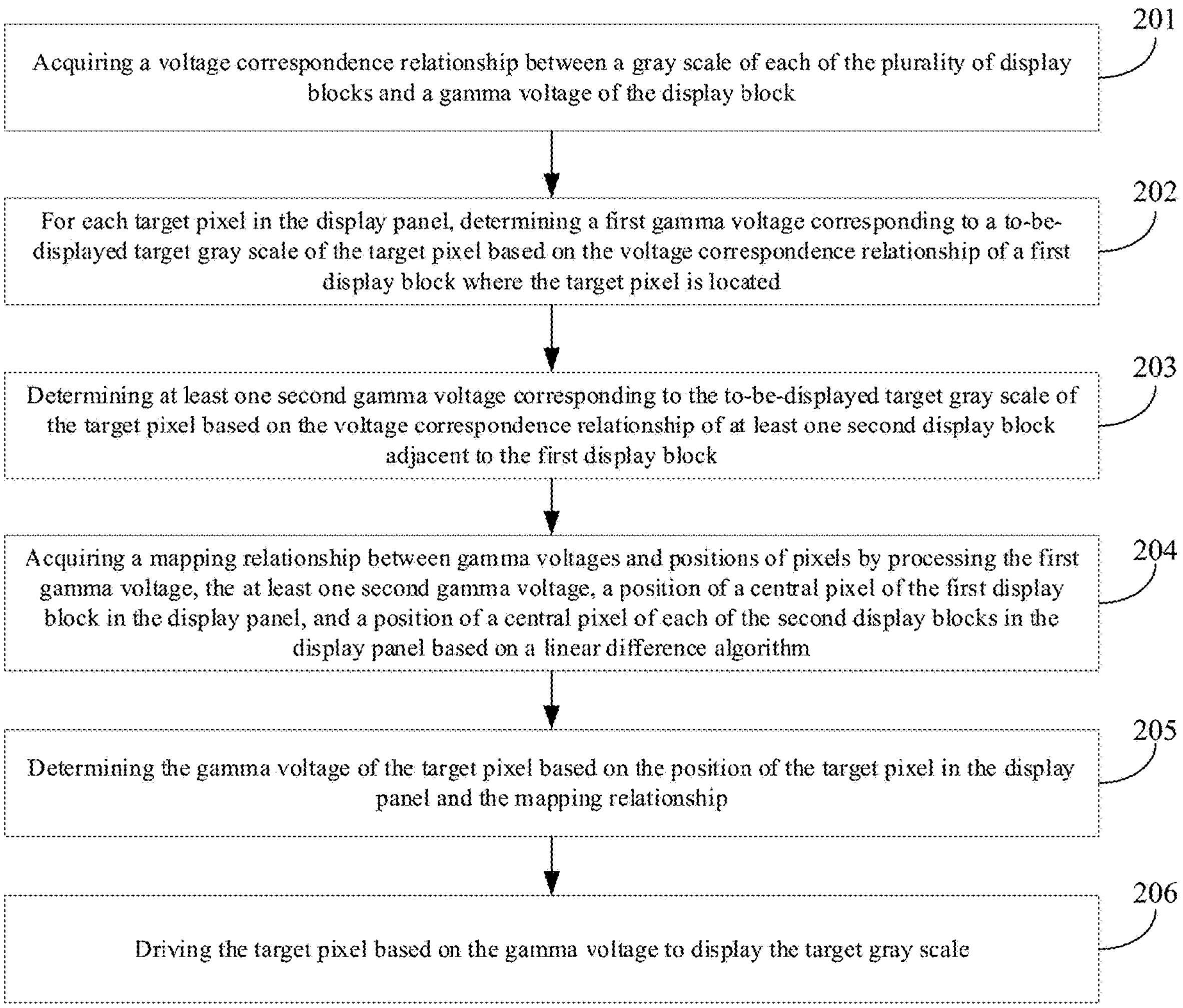
FIG. 3 is a flowchart of another method for driving a display panel according to some embodiments of the present disclosure.

In the embodiments of the present disclosure, by way of example, the gamma correction data of each of the plurality of display blocks is the voltage correspondence relationship of the display block, such that the method for driving a display panel according to the embodiments of the present disclosure is exemplarily described. The method is applicable to a driver circuit for a display panel. The display panel includes a plurality of display blocks. Referring to FIG. 3, the method includes the following steps.

In 201, a voltage correspondence relationship between a gray scale of each of the plurality of display blocks and a gamma voltage of the display block is acquired.

The voltage correspondence relationships of the plurality of display blocks are acquired by performing gamma correction on at least one of the plurality of display blocks. For example, the voltage correspondence relationship of each of the plurality of display blocks is acquired by performing the gamma correction on the display block, that is, the voltage correspondence relationships of the plurality of display blocks are acquired upon performing the gamma correction on the plurality of display blocks respectively.

Or, the voltage correspondence relationships of the plurality of display blocks are acquired upon performing the gamma correction on a target display block among the plurality of display blocks. The target display block is any one of the plurality of display blocks. For example, the driver circuit acquires the voltage correspondence relationship, which is acquired upon performing the gamma correction on the target display block, between the gray scale of the target display block and the gamma voltage of the target display block, and the offset correspondence relationship between a gray scale and a voltage offset of each of other display blocks in the plurality of display blocks except the target display block, and then the driver circuit determines the voltage correspondence relationship of any one of the other display blocks based on the voltage correspondence relationship and the offset correspondence relationship of any one of the other display blocks. The voltage offset corresponding to any gray scale in the offset correspondence relationship is an offset relative to the gamma voltage corresponding to any gray scale in the voltage correspondence relationship of the target display block. That is, the driver circuit calculates the voltage correspondence relationships of the other display blocks based on the voltage correspondence relationship of the target display block and the offset correspondence relationships of the other display blocks.

In the embodiments of the present disclosure, the plurality of display blocks are divided in advance prior to performing the gamma correction on the display panel. The plurality of display blocks are arranged in an array. For example, the plurality of display blocks are arranged in one row and multiple columns, or arranged in multiple rows and multiple columns. An arrangement manner of the plurality of display blocks depends on a division manner of the plurality of display blocks.

Figure 4:
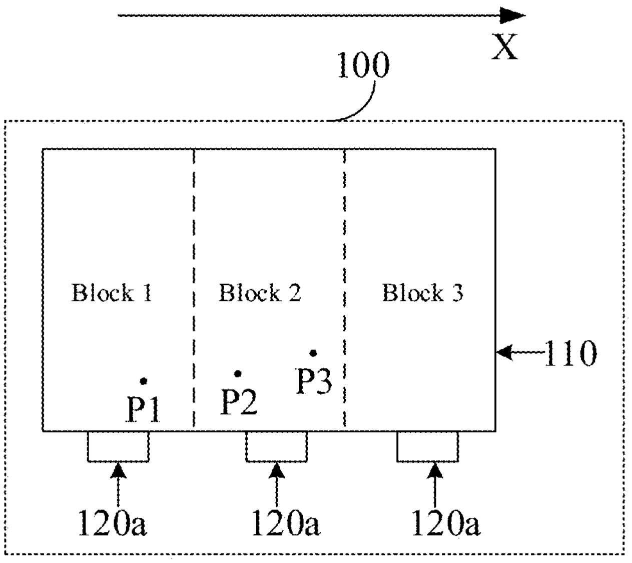
FIG. 4 is a schematic diagram of arrangement of a plurality of display blocks of a display panel according to some embodiments of the present disclosure.

In some embodiments, referring to FIG. 4, a display device 100 to which the display panel 110 belongs includes a plurality of source driver circuits 120*a* (FIG. 4 shows three source driver circuits 120*a*). The plurality of display blocks of the display panel are acquired by division based on the plurality of source driver circuits, and at least one source driver circuit corresponds to one display block. As the plurality of source driver circuits are usually arranged in a pixel row extending direction (namely, an X direction shown in FIG. 4) of the display panel, the plurality of display blocks divided based on the plurality of source driver circuits are also arranged in a pixel row direction of the display panel, namely, the plurality of display blocks are arranged in one row and multiple columns. Each of the display blocks corresponds to at least one (namely, one) source driver circuit and is connected to the corresponding at least one source driver circuit.

It is understood that in the embodiments, a total quantity of the plurality of display blocks depends on a total quantity of the plurality of source driver circuits and a total quantity of the source driver circuits corresponding to each of the display blocks.

For example, continuing to refer to FIG. 4, assuming that the total quantity of the plurality of source driver circuits is three, and each of the display blocks corresponds to one source driver circuit, the display panel 100 is divided into three display blocks, such as block 1, block 2, and block 3 shown in FIG. 4.

As each of the display blocks corresponds to one source driver circuit, it is convenient to perform the gamma correction on the display block.

In another optional embodiment, the plurality of display blocks of the display panel are divided based on a difference in display brightness of the display panel prior to the gamma correction. Correspondingly, prior to performing the gamma correction, a difference value of actually measured brightness of the various pixels in each of the plurality of display blocks divided is less than a brightness threshold, and a difference value between actually measured brightness of any two pixels in two adjacent display blocks is greater than the brightness threshold.

It is understood that as the display brightness of a plurality of regions in a large-sized display panel (for example, a size greater than 10 inches) is usually greatly different, the display panel is usually divided, based on the difference in display brightness, into the plurality of display blocks arranged in multiple rows and multiple columns. For example, referring to FIG. 5 and FIG. 6, the plurality of display blocks (namely, block 1 to block 9 shown in FIG. 5 or FIG. 6) are arranged in three rows and three columns. Or, the plurality of display blocks are arranged in nine rows and nine columns, or the plurality of display blocks are arranged in two rows and seven columns.

Figure 5:
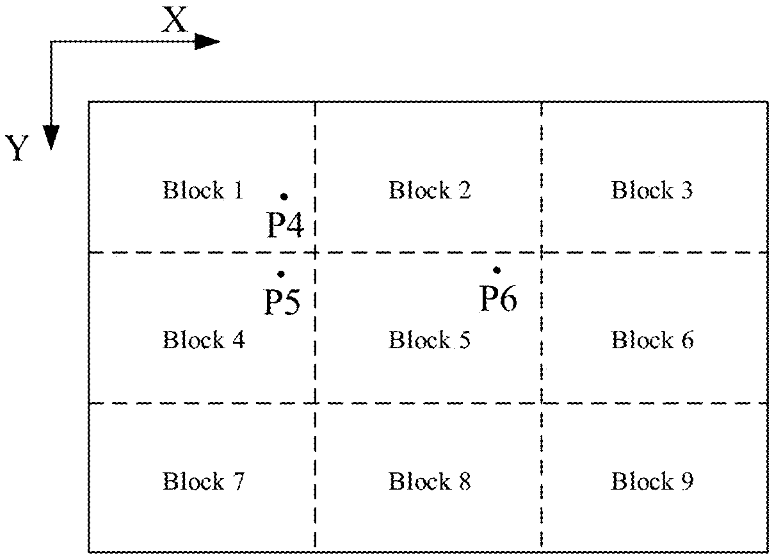
FIG. 5 is a schematic diagram of arrangement of a plurality of display blocks of another display panel according to some embodiments of the present disclosure.
Figure 6:
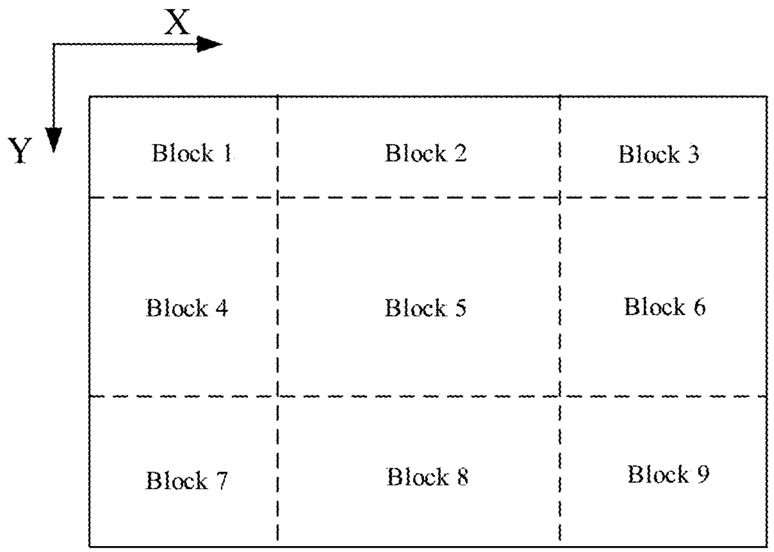
FIG. 6 is a schematic diagram of arrangement of a plurality of display blocks of still another display panel according to some embodiments of the present disclosure.

In the embodiments of the present disclosure, the plurality of display blocks are acquired by division based on the difference in the display brightness of the display panel, referring to FIG. 5 and FIG. 6, widths of the various display blocks located in the same row are equal, and lengths of the various display blocks located in the same column are equal. In this case, it is convenient to perform the gamma correction on at least one display block among the plurality of display blocks.

The width of each of the display blocks is parallel to a pixel column extending direction (namely, a Y direction shown in FIG. 5 and FIG. 6) of the display panel, and the length of each of the display blocks is parallel to a pixel row extending direction (namely, an X direction shown in FIG. 5 and FIG. 6) of the display panel.

It is understood that in the embodiments, the lengths of the various display blocks located in the same row are flexibly adjusted based on the difference in the display brightness of the display panel, and the widths of the various display blocks located in the same column are also flexibly adjusted. Correspondingly, positions of the various display blocks in the display panel are flexibly adjusted. Therefore, a manner for dividing the display panel based on the difference in the display brightness has high flexibility, and is applicable to display panels with different brightness differences.

In some embodiments, referring to FIG. 5, any two of the plurality of display blocks are equal in length and equal in width.

In some embodiments, each of the plurality of display blocks is rectangular in shape, such that it is convenient to perform the gamma correction on at least one of the plurality of display blocks. A size of each of the display blocks is less than a size threshold. For example, the size threshold is 10 inches. Therefore, it is ensured that the display brightness of the display panel is uniform upon the display panel is driven based on the corrected voltage correspondence relationships of the plurality of display blocks.

In 202, for each target pixel in the display panel, a first gamma voltage corresponding to a to-be-displayed target gray scale of the target pixel is determined based on the voltage correspondence relationship of a first display block where the target pixel is located.

In the embodiments of the present disclosure, for each target pixel in the display panel, the driver circuit determines, based on a position of the target pixel in the display panel and the positions of the plurality of display blocks in the display panel, the first display block where the target pixel is located. Later, the driver circuit determines, from the voltage correspondence relationship between a gray scale of the first display block and a gamma voltage of the first display block, a first gamma voltage corresponding to the target gray scale based on the to-be-displayed target gray scale of the target pixel.

The position of each of the display blocks in the display panel and the position of each of the pixels in the display panel are pre-stored in the driver circuit. The position of each of the plurality of display blocks in the display panel is characterized by a position of a top-left pixel of the display block in the display panel and a position of a bottom-right pixel of the display block in the display panel. The position of each of the pixels in the display panel refers to a coordinate of the pixel in a coordinate system where the display panel is located. The coordinate system is a coordinate system established by using a point on the display panel (for example, a top-left vertex of the display panel) as an origin of coordinates, using the pixel row extending direction of the display panel as a horizontal axis extending direction, and using the pixel column extending direction of the display panel as a vertical axis extending direction.

In 203, at least one second gamma voltage corresponding to the to-be-displayed target gray scale of the target pixel is determined based on the voltage correspondence relationship of at least one second display block adjacent to the first display block.

The driver circuit determines the at least one second display block based on the positions of the plurality of display blocks in the display panel and the position of the first display block in the display panel. Each of the second display blocks is adjacent to the first display block. Later, for each of the second display blocks, the driver circuit determines, from the voltage correspondence relationship between a gray scale of the second display block and a gamma voltage of the second display block, a second gamma voltage corresponding to the target gray scale based on the to-be-displayed target gray scale of the target pixel.

In the embodiments of the present disclosure, the process that the driver circuit determines the at least one second display block includes:

For a scene in which the plurality of display blocks are arranged in one row and multiple columns, a quantity of the at least one second display block is one, and the driver circuit determines a display block adjacent to the first display block and nearest to the target pixel as the second display block.

It is understood that in the case that a quantity of the display blocks adjacent to the first display block is equal to 2, the driver circuit determines, from two adjacent display blocks, a display block nearer to the target pixel as the second display block. In the case that a quantity of the display blocks adjacent to the first display block is equal to 1, the driver circuit directly determines the adjacent display block as the second display block.

Exemplarily, continuing to refer to FIG. 4, assuming that the target pixel is pixel P1 in block 1, namely, the first display block is block 1. As only block 2 is adjacent to block 1, namely, as the quantity of display blocks adjacent to block 1 is 1, the driver circuit directly determines block 2 as the second display block.

Assuming that the target pixel is pixel P2 in block 2, the first display block is block 2. In this case, block 1 and block 3 are both adjacent to block 2. The driver circuit determines block 1 as the second display block because a distance from block 1 to pixel P2 is shorter than a distance from block 3 to pixel P2.

Similarly, assuming that the target pixel is pixel P3 in block 2, as a distance from block 3 to pixel P3 is shorter, the driver circuit determines block 3 as the second display block.

For a scene in which the plurality of display blocks are arranged in multiple rows and multiple columns, a quantity of the at least one second display block is three, the driver circuit first determines a display block adjacent to the first display block in the pixel row extending direction and nearest to the target pixel as the second display block, and determines a display block adjacent to the first display block in the pixel column extending direction and nearest to the target pixel as the second display block. Later, the driver circuit determines a display block respectively adjacent to the second display block and the second display block as the second display block. Therefore, the three second display blocks and the first display block are arranged in a rectangular shape.

It is understood that in the case that the quantity of the display blocks adjacent to the first display block is greater than 3, the driver circuit determines the second display block and the second display block first, and then determines the second display block. In the case that the quantity of the display blocks adjacent to the first display block is equal to 3, the driver circuit directly determines the three display blocks adjacent to the first display block as the three second display blocks.

For example, continuing to refer to FIG. 5, assuming that the target pixel is pixel P4 in block 1, namely, block 1 is the first display block. The quantity of display blocks adjacent to block 1 is 3, such that the driver circuit directly determines block 2, block 4, and block 5 adjacent to block 1 as the second display blocks respectively.

Assuming that the target pixel is pixel P5 in block 4, namely, block 4 is the first display block, and the quantity of display blocks adjacent to block 4 is 5, which is greater than 3. As only block 5 is adjacent to block 4 in the pixel row extending direction, the driver circuit determines block 5 as the second display block A. As a distance from block 1 to pixel P5 is greater than a distance from block 7 to pixel P5 in the pixel column extending direction, the driver circuit determines block 1 as the second display block B. As block 2 is adjacent to block 1, block 4, and block 5 respectively, the driver circuit determines block 2 as the second display block C.

Similarly, assuming that the target pixel is pixel P6 in block 5, namely, block 5 is the first display block. Block 6 is adjacent to block 5 and nearest to pixel P6 in the pixel row extending direction, block 2 is adjacent to block 5 and nearest to pixel P6 in the pixel column direction, and block 3 is adjacent to block 2, block 5, and block 6 respectively, such that the driver circuit determines block 6 as the second display block A, determines block 2 as the second display block B, and determines block 3 as the second display block C.

In 204, a mapping relationship between gamma voltages and positions of pixels is acquired by processing the first gamma voltage, the at least one second gamma voltage, a position of a central pixel of the first display block in the display panel, and a position of a central pixel of each of the second display blocks in the display panel based on a linear difference algorithm.

In the embodiments of the present disclosure, as the luminance of the central pixel of any display block is generally taken as the display brightness of the display block in the case that gamma correction is performed on the display block, the driver circuit acquires the mapping relationship between gamma voltages and positions of pixels by processing the first gamma voltage, the at least one second gamma voltage, the position of the central pixel of the first display block in the display panel, and the position of the central pixel of each of the second display blocks in the display panel based on the linear difference algorithm.

It is understood that in the case that the plurality of display blocks are arranged in one row and multiple columns, the mapping relationship between gamma voltages and positions of pixels, acquired by the driver circuit, refers to: a mapping relationship between gamma voltages and abscissas of pixels.

In the case that the plurality of display blocks are arranged in multiple rows and multiple columns, the process that the driver circuit acquires the mapping relationship between the gamma voltages and the positions of the pixels includes: The driver circuit first processes the position of the central pixel of the first display block, the first gamma voltage, and the position of the central pixel of a second display block arranged in the pixel row (or pixel column) extending direction of the first display block based on the linear difference algorithm; acquires a first mapping sub-relationship between a first gamma sub-voltage and an abscissa (or a pixel column coordinate) of the pixel based on a second gamma voltage determined from the voltage correspondence relationship of the second display block; and acquires a second mapping sub-relationship between a second gamma sub-voltage and an abscissa (or a pixel column coordinate) of the pixel by processing the positions of the central pixels of the other two second display blocks, and the other two gamma voltages based on the linear difference algorithm. Then the driver circuit acquires the mapping relationship between the gamma voltages and the positions of the pixels by processing the first mapping sub-relationship and the second mapping sub-relationship again based on the linear difference algorithm.

In the embodiments of the present disclosure, the plurality of display blocks are as shown in FIG. 5. By way of example, the target pixel is pixel P5 shown in FIG. 5, namely, the first display block is block 4, and the three second display blocks are respectively block 1, block 2, and block 5. The correspondence relationship between gamma voltages and positions of pixels, acquired by the driver circuit, is exemplarily described:

It is assumed that the position of the central pixel of block 1 among the plurality of display blocks is $(x_1, y_1)$, that the position of the central pixel of block 2 is $(x_2, y_1)$, that the position of the central pixel of block 4 is $(x_1, y_2)$, and that the position of the central pixel of block 5 is $(x_2, y_2)$. It is assumed that the second gamma voltage determined based on the voltage correspondence relationship of block 1 is $V_1$, that the second gamma voltage determined based on the voltage correspondence relationship of block 2 is $V_2$, that the first gamma voltage is $V_3$, and that the second gamma voltage determined based on the voltage correspondence relationship of block 5 is $V_4$.

The driver circuit acquires the first mapping sub-relationship based on the first gamma voltage $V_3$, the position $(x_1, y_2)$ of the central pixel of block 4, the second gamma voltage $V_4$, and the position $(x_2, y_2)$ of the central pixel of block 5, and acquires the second mapping sub-relationship based on the second gamma voltage $V_1$, the position $(x_1, y_1)$ of the central pixel of block 1, the second gamma voltage $V_2$, and the position $(x_2, y_1)$ of the central pixel of block 2, wherein the first mapping sub-relationship satisfies the following formula (1), and the second mapping sub-relationship satisfies the following formula (2).

$$V_m = \frac{V_4 - V_3}{x_2 - x_1} \times (x - x_1) + V_3 \qquad \text{Formula (1)}$$

$$V_n = \frac{V_2 - V_1}{x_2 - x_1} \times (x - x_1) + V_1 \qquad \text{Formula (2)}$$

Then the driver circuit acquires the correspondence relationship between gamma voltages and positions of pixels shown in formula (3) based on the first mapping sub-relationship and the second mapping sub-relationship, namely, the above formulas (1) and (2).

$$V = \frac{V_m - V_n}{y_2 - y_1} \times (y - y_1) + V_n \qquad \text{Formula (3)}$$

In Formula (1) and Formula (2), x is the abscissa of the pixel; and in Formula (3), V is the gamma voltage, and y is the ordinate of the pixel.

In 205, the gamma voltage of the target pixel is determined based on the position of the target pixel in the display panel and the mapping relationship.

Upon acquiring the mapping relationship between gamma voltages and positions of pixels, the driver circuit acquires the gamma voltage of the target pixel by substituting the position of the target pixel in the display panel into the mapping relationship.

In 206, the target pixel is driven based on the gamma voltage to display the target gray scale.

Upon acquiring the gamma voltage of the target pixel, the driver circuit generates a driving signal based on the gamma voltage of the target pixel to drive the target pixel to display the target gray scale.

In the embodiments of the present disclosure, the driver circuit acquires the voltage correspondence relationship between the gray scale of each of the plurality of display blocks and the gamma voltage of each of the plurality of display blocks based on various optional implementations, that is, the driver circuit executes step 201 based on the various optional implementations.

As a first optional implementation, the driver circuit performs gamma correction on the plurality of display blocks respectively, such that the voltage correspondence relationship of each of the plurality of display blocks is acquired. That is, the voltage correspondence relationships of the plurality of display blocks are acquired by performing the gamma correction on the plurality of display blocks respectively. Thus, it is ensured that the accuracy of the determined voltage correspondence relationships of the plurality of display blocks is relatively high.

Figure 7:
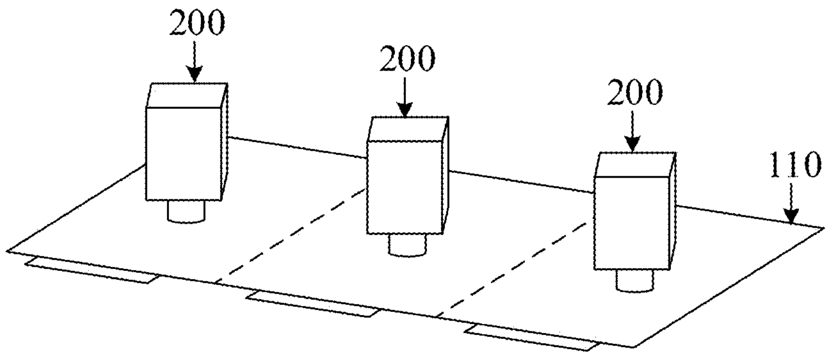
FIG. 7 is a schematic diagram of collecting, by an optical device, display brightness of display blocks according to some embodiments of the present disclosure.

In this implementation, as shown in FIG. 7, the driver circuit is connected to an optical device (for example, a color analyzer) configured to collect display brightness of a display block, for example, an optical device 200 shown in FIG. 7. For each of the plurality of display blocks, the optical device 200 sends the collected display brightness of the display block to the driver circuit. Then, the driver circuit performs the gamma correction on the display block based on the acquired display brightness of the display block, such that the voltage correspondence between the gray scale of the display block and the gamma voltage of the display block. The display brightness of the display block is the luminance of the central pixel of the display block.

As a second optional implementation, the driver circuit acquires the voltage correspondence relationships of the plurality of display blocks by performing the gamma correction on only one of the plurality of display blocks. Therefore, the efficiency of acquiring the voltage correspondence relationships of the plurality of display blocks can be improved.

In this implementation, the driver circuit acquires a voltage correspondence relationship between the gray scale of a reference display block among a plurality of display blocks included in a reference panel and the gamma voltage of the reference display block, and an offset correspondence relationship between the gray scale of each of remaining display blocks of the plurality of display blocks of the reference panel except the reference display block and a voltage offset. The voltage offset corresponding to any gray scale in the offset correspondence relationship of each of the remaining display blocks is an offset relative to the gamma voltage corresponding to any gray scale in the voltage correspondence relationship of the reference display block. The voltage correspondence relationship of the reference display block and the offset correspondence relationship of each of the remaining display blocks are acquired upon performing, by a correcting device, the gamma correction on the reference panel, and is sent to the driver circuit. The reference panel has the same model number as that of the display panel.

Then, the driver circuit acquires display brightness of a target display block among the plurality of display blocks included in the display panel, and acquires the voltage correspondence relationship between the gray scale of the target display block and the gamma voltage of the target display block by performing the gamma correction on the target display block based on the display brightness of the target display block. A total quantity of the plurality of display blocks of the display panel is equal to a total quantity of the plurality of display blocks of the reference panel. Upon the display panel overlaps the reference panel, the target display block of the display panel overlaps the reference display block of the reference panel, and each of other display blocks of the display panel overlaps one remaining display block in the reference panel. That is, the plurality of display blocks of the reference panel correspond to the plurality of display blocks of the display panel in a one-to-one manner. A and B overlap, which means: an orthographic projection of A on a plane where B is located overlaps B.

Later, for each of other display blocks in the display panel except the target display block, the driver circuit determines the voltage correspondence relationship of the display block based on the voltage correspondence relationship of the target display block and the offset correspondence relationship of the remaining display block corresponding to the display block. That is, the driver circuit determines the offset correspondence relationship of the remaining display block corresponding to the display block as the offset correspondence relationship of the display block, such that the voltage correspondence relationship of the display block is acquired. The position of the remaining display block corresponding to the display block relative to the reference display block is the same as the position of the display blocks relative to the target display block.

For example, the driver circuit determines a sum of a gamma voltage corresponding to any gray scale in the voltage correspondence relationship of the target display block and a voltage offset corresponding to the any gray scale in the offset correspondence relationship as the gamma voltage corresponding to the any gray scale in the voltage correspondence relationship of the display block.

It is understood that for the manner of acquiring the voltage correspondence relationships of the plurality of display blocks by performing the gamma correction on one display block, upon acquiring the voltage correspondence relationship of each of other display blocks, the driver circuit also verifies the voltage correspondence relationship of the display block to detect the accuracy of the voltage correspondence relationship of the display block. For example, the driver circuit drives the display block by using the gamma voltage corresponding to any gray scale in the voltage correspondence relationship of the display block, and receives actually measured display brightness of the display block collected by the optical device in this case. In the case that the driver circuit determines that the actually measured display brightness is equal to the ideal display brightness (or equal to the ideal display brightness within an error range), it is determined that the calculated correspondence relationship of the display block is relatively accurate. The ideal display brightness is determined based on the any gray scale.

As a third optional implementation, the driver circuit is connected to the correcting device, and the correcting device acquires correction information of the plurality of display blocks by performing the gamma correction on the at least one display block, and sends the acquired correction information to the driver circuit. The driver circuit then acquires the voltage correspondence relationship of each of the plurality of display blocks based on the correction information of the plurality of display blocks.

The correction information includes the voltage correspondence relationship of each of the plurality of display blocks. In this case, the driver circuit directly acquires the voltage correspondence relationship of each of the display blocks upon receiving the correction information.

Or, the correction information includes the voltage correspondence relationship of the target display block among the plurality of display blocks, and the offset correspondence relationship between the gray scale of each of other display blocks among the plurality of display blocks except the target display block and the voltage offset. The voltage offset corresponding to any gray scale in the offset correspondence relationship is an offset relative to the gamma voltage corresponding to any gray scale in the voltage correspondence relationship of the target display block.

In this case, after receiving the correction information, the driver circuit acquires the voltage correspondence relationship between the gray scale of the target display block among the plurality of display blocks and the gamma voltage of the target display block, and the offset correspondence relationship between the gray scale of each of other display blocks among the plurality of display blocks except the target display block and the voltage offset. Then, for each of the other display blocks, the driver circuit acquires the voltage correspondence relationship of the display block based on the offset correspondence relationship of the display block and the voltage correspondence relationship of the target display block. For example, the driver circuit determines a sum of a gamma voltage corresponding to any gray scale in the voltage correspondence relationship of the target display block and a gamma voltage corresponding to the any gray scale in the offset correspondence relationship of the display block as the gamma voltage corresponding to the any gray scale in the voltage correspondence relationship of the display block.

It is understood that in the process that the correcting device performs the gamma correction on each of the plurality of display blocks, please refer to the aforementioned related implementation process that the driver circuit performs the gamma correction on each of the display blocks, and the embodiments of the present disclosure will not describe this repeatedly.

It is also understood that a gamma curve is acquired by fitting based on the plurality of gamma voltages and the plurality of gray scales in the voltage correspondence relationship of each of the display blocks. As the voltage correspondence relationship of each of the plurality of display blocks is acquired upon performing the gamma correction on at least one display block, gamma values of a plurality of gamma curves acquired by fitting based on the voltage correspondence relationships of the plurality of display blocks are possibly different.

Figure 8:
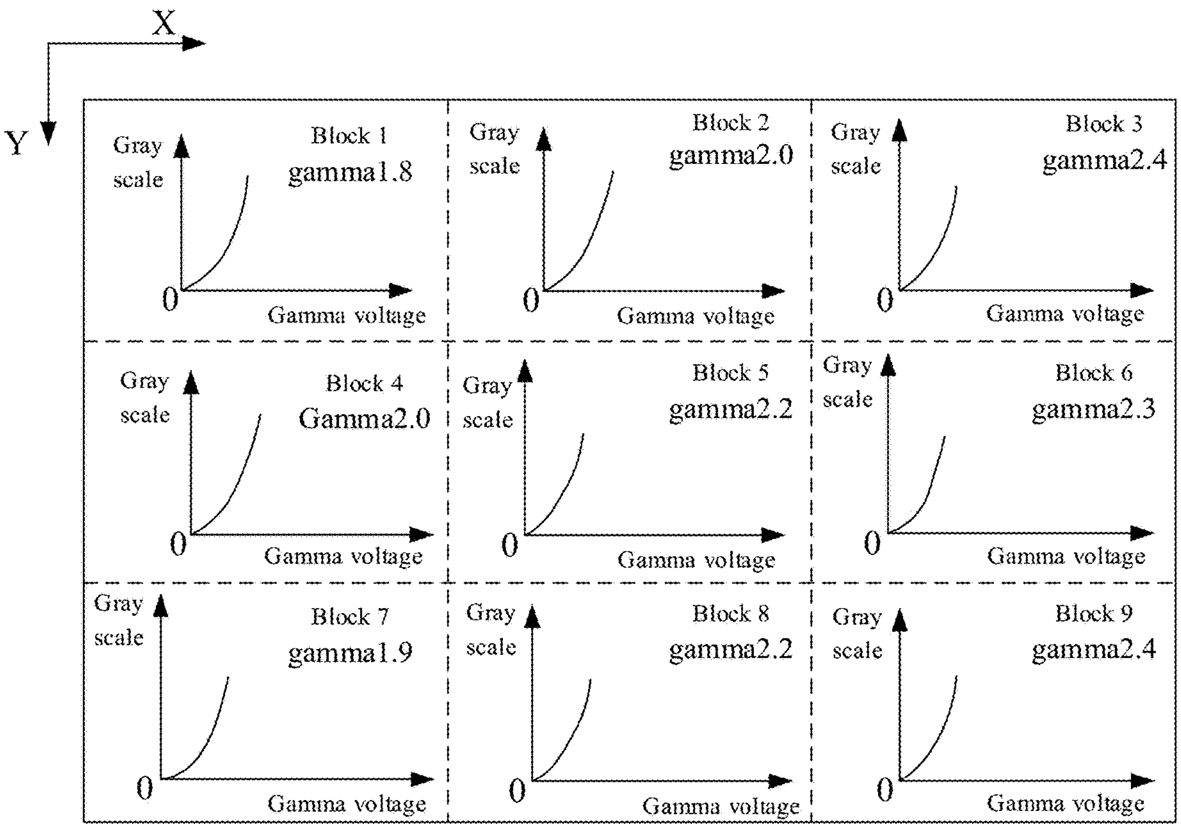
FIG. 8 is a schematic diagram showing a gamma curve acquired by fitting based on voltage correspondence relationships of various display blocks and gamma values of the gamma curve according to some embodiments of the present disclosure.

For example, referring to FIG. 8, the plurality of display blocks include block 1 to block 9. A gamma value of a gamma curve acquired by fitting based on the voltage correspondence relationship of block 1 is 1.8; a gamma value of a gamma curve acquired by fitting based on the voltage correspondence relationship of block 2 is 2.0; and gamma values of gamma curves acquired by fitting based on the voltage correspondence relationships of block 3 to block 9 is: 2.4, 2.0, 2.2, 2.3, 1.9, 2.2, and 2.4 in sequence.

In the embodiments of the present disclosure, for an implementation (namely, the foregoing first implementation and the foregoing second implementation) in which the driver circuit acquires the voltage correspondence relationships of the plurality of display blocks by performing the gamma correction on at least one display block, the driver circuit also records the correspondence relationships of the plurality of display blocks in a memory upon acquiring the voltage correspondence relationship of each of the plurality of display blocks. For example, the correspondence relationships of the display blocks are recorded in the form of a table, and the table is referred to as a look up table (LUT).

In a first optional example, the driver circuit stores the voltage correspondence relationship of each of the plurality of display blocks respectively.

In a second optional example, the driver circuit stores the voltage correspondence relationship of the target display block among the plurality of display blocks, and stores the offset correspondence relationship between the gray scale of each of other display blocks among the plurality of display blocks except the target display block and the voltage offset. For example, assuming that the plurality of display blocks are the three display blocks as shown in FIG. 4, the driver circuit takes block 2 as the target display block, and calculates the offset correspondence relationship of each of block 1 and block 3 relative to block 2. For example, an offset corresponding to any gray level in the offset correspondence relationship of block 1 is: a difference value acquired by subtracting the gamma voltage corresponding to the any gray scale in the voltage correspondence relationship of block 2 by the gamma voltage corresponding to the any gray scale in the voltage correspondence relationship of block 1.

As a storage space occupied by the voltage offset is smaller than that occupied by the gamma voltage, using the second implementation to record the correspondence relationships of the plurality of display blocks can effectively save an internal memory of the driver circuit. For example, one voltage offset may occupy 8 bits, and one gamma voltage may occupy 12 bits.

It is understood that as display conditions of the display blocks are different at different gray scales and different maximum display brightness, the display blocks are usually corrected for different gray scales and different maximum display brightness respectively during the gamma correction. Further, as each of the pixels in the display panel usually includes a plurality of sub-pixels with different colors, the display blocks are usually corrected for the display brightness with different colors respectively during the gamma correction.

Based on this, the voltage correspondence relationship of each of the display blocks includes: a plurality of voltage correspondence sub-relationships in different colors, and each of the voltage correspondence sub-relationships records: the gamma voltages at the respective maximum display brightness and the respective gray scales.

Exemplarily, it is assumed that the plurality of display blocks include nine blocks; each of the pixels includes a red (R) sub-pixel, a green (G) sub-pixel, and a blue (B) sub-pixel; the plurality of gray scales include gray scale 0 to gray scale 1023; a size of each display brightness among the plurality of maximum display brightness is controlled based on DBV, and the DBV is usually 12 bits, that is, 4095 steps. The gamma voltages recorded by the driver circuit at different maximum display brightness and different gray levels of the green sub-pixels in block 9 are as shown in FIG. 9.

In the embodiments of the present disclosure, the driver circuit for a display panel includes: a timing control (TCON) circuit and a source driving module. The source driving module includes a plurality of source driver circuits described above. In a displaying process, referring to FIG. 10, the timing control circuit of the display device acquires a voltage correspondence relationship of at least one of a plurality of display blocks from a memory, and determines a gamma voltage of a pixel in each of the display blocks based on the at least one voltage correspondence relationship. Then, the timing control circuit sends the gamma voltage of the pixel to the source driving module, such that the source driving module drives the pixel to emit light. For example, the timing control circuit sends the gamma voltage of the pixel to the source driver circuit connected to a display block to which the pixel belongs.

Figure 10:
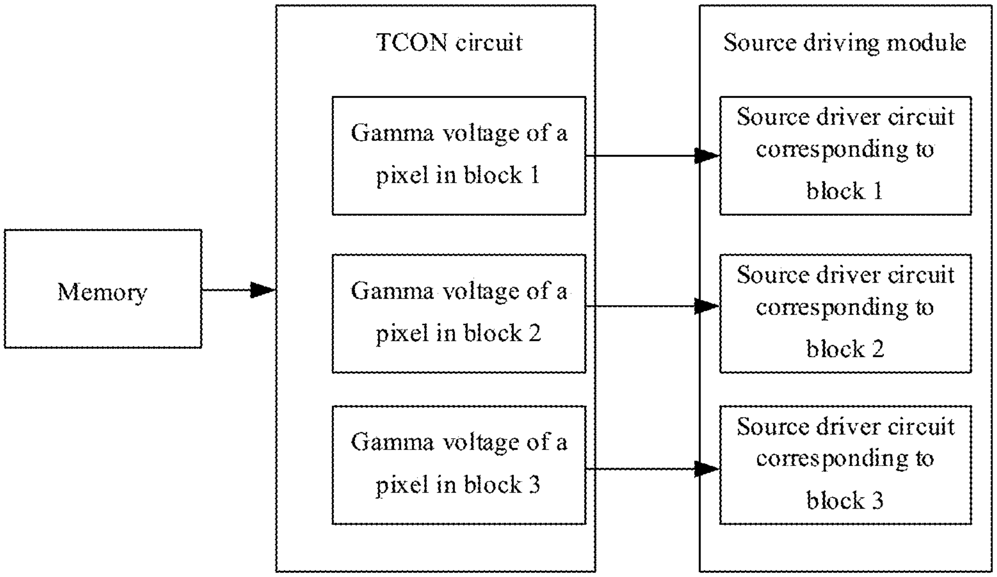
FIG. 10 is a schematic diagram of driving pixels of a driver circuit in a displaying process according to some embodiments of the present disclosure.

For example, continuing to refer to FIG. 10, assuming that there are three display blocks and each of the display blocks corresponds to one source driver circuit, the timing control circuit sends a gamma voltage of a pixel located in a first display block to the source driver circuit corresponding to the first display block, sends a gamma voltage of a pixel located in a second display block to the source driver circuit corresponding to the second display block, and sends a gamma voltage of a pixel located in a third display block to the source driver circuit corresponding to the third display block.

It should be noted that an order of the steps of the method for driving a display panel according to some embodiments of the present disclosure can be appropriately adjusted, and the steps can also be correspondingly added or deleted as needed. Any variations of the method that may be envisaged by those skilled in the art within the technical scope disclosed herein also fall within the protection scope of the present disclosure and thus are not described herein.

In summary, the embodiments of the present disclosure provide a method for driving a display panel. The driver circuit acquires gamma correction data of each of a plurality of display blocks, and the gamma correction data of the plurality of display blocks is acquired by performing gamma correction on at least one display block, such that the display panel is driven based on the gamma correction data of the various display blocks, and brightness of the display panel is ensured to be uniform.

Furthermore, a gamma voltage of each pixel is determined based on a position of the pixel, a first correction voltage, and a second correction voltage, such that luminance of adjacent pixels in a displaying process is ensured to be smoothly transitioned, and a relatively good displaying effect of the display panel is ensured.

Figure 11:
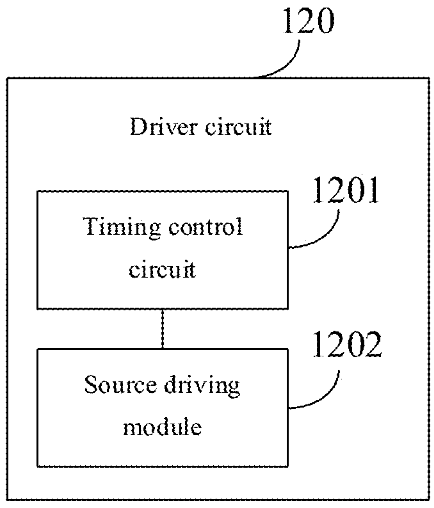
FIG. 11 is a schematic structural diagram of a driver circuit according to some embodiments of the present disclosure.

The embodiments of the present disclosure provide a driver circuit for a display panel. The driver circuit performs the method for driving a display panel according to the foregoing method embodiments. The display panel includes: a plurality of display blocks. Referring to FIG. 11, the driver circuit 120 includes: a timing control circuit 1201 and a source driving module 1202.

The timing control circuit 1201 is configured to: acquire gamma correction data of each of the display blocks, wherein the gamma correction data of the plurality of display blocks is acquired by performing gamma correction on at least one of the plurality of display blocks; for each pixel in the display panel, determine, based on the gamma correction data of a first display block where the pixel is located, a first correction voltage corresponding to a to-be-displayed target gray scale of the pixel; determine, based on the gamma correction data of at least one second display block adjacent to the first display block, at least one second correction voltage corresponding to the target gray scale; and determine a gamma voltage of the pixel based on the first correction voltage, the at least one second correction voltage, and a position of the pixel in the display panel, and send the gamma voltage of the pixel to the source driving module.

The source driving module 1202 is configured to drive, based on the gamma voltage, the pixel to display the target gray scale.

In some embodiments, the timing control circuit 1201 is configured to:

acquire a mapping relationship between the correction voltages and the position of the pixel by processing the first correction voltage, the at least one second correction voltage, a position of a central pixel of the first display block in the display panel, and a position of a central pixel of each of the second display blocks in the display panel based on a linear difference algorithm; and determine the gamma voltage of the pixel based on the position of the pixel in the display panel and the mapping relationship.

In some embodiments, the gamma correction data is a voltage correspondence relationship between a gray scale and a gamma voltage; and the first correction voltage and the at least one second correction voltage are both gamma voltages corresponding to the target gray scale. The timing control circuit 1201 is configured to:

acquire the gamma voltage of the pixel by substituting the position of the pixel in the display panel into the mapping relationship.

In some embodiments, the timing control circuit 1201 is configured to:

acquire a voltage correspondence relationship between the gray scale of a target display block among the plurality of display blocks and the gamma voltage of the target display block;

acquire an offset correspondence relationship between the gray scale of each of other display blocks of the plurality of displaying regions except the target display block and a voltage offset, wherein the voltage offset corresponding to any gray scale in the offset correspondence relationship is an offset relative to the gamma voltage corresponding to any gray scale in the voltage correspondence relationship of the target display block; and for each of the other display blocks, acquire a voltage correspondence relationship of the display block based on the offset correspondence relationship of the display block and the voltage correspondence relationship of the target display block.

In some embodiments, a storage space occupied by the voltage offset is smaller than a storage space occupied by the gamma voltage.

In some embodiments, the timing control circuit 1201 is configured to:

acquire display brightness of each of the plurality of display blocks; and acquire the voltage correspondence relationship between the gray scale of the display block and the gamma voltage of the display block by performing gamma correction on the display block based on the display brightness of each of the plurality of display blocks.

In some embodiments, the timing control circuit 1201 is configured to:

acquire a voltage correspondence relationship between the gray scale of a reference display block of a plurality of display blocks included in a reference panel and the gamma voltage of the reference display block, and an offset correspondence relationship between the gray scale of each of remaining display blocks of the plurality of display blocks of the reference panel except the reference display block and a voltage offset, wherein the voltage offset corresponding to any gray scale in the offset correspondence relationship of the remaining display block is an offset relative to the gamma voltage corresponding to any gray scale in the voltage correspondence relationship of the reference display block;

acquire display brightness of the target display block among the plurality of display blocks comprised in the display panel, wherein the plurality of display blocks of the reference panel correspond to the plurality of display blocks of the display panel in a one-to-one manner;

acquire the voltage correspondence relationship between the gray scale of the target display block and the gamma voltage of the target display block by performing gamma correction on the target display block based on the display brightness of target display block; and for each of other display blocks in the display panel except the target display block, determine the voltage correspondence relationship of the display block based on the voltage correspondence relationship of the target display block and the offset correspondence relationship of the remaining display block corresponding to the display block.

In some embodiments, the gamma correction data of a target display block among the plurality of display blocks is a voltage correspondence relationship between a gray scale and a gamma voltage, and an offset correspondence relationship between a gray scale and a voltage offset; the gamma correction data of each of other display blocks of the plurality of display blocks except the target display block is an offset correspondence between a gray scale and a voltage offset; and the voltage offset corresponding to any gray scale in the offset correspondence relationship is an offset relative to the gamma voltage corresponding to any gray scale in the voltage correspondence relationship of the target display block. The first correction voltage and the at least one second correction voltage are both voltage offsets corresponding to the target gray scale. The timing control circuit 1201 is configured to:

acquire a voltage offset of the pixel by substituting the position of the pixel in the display panel into the mapping relationship; and determine the gamma voltage of the pixel based on the voltage offset of the pixel and the gamma voltage corresponding to the target gray scale in the voltage correspondence relationship.

In some embodiments, the plurality of display blocks are arrayed.

In some embodiments, a display device to which the display panel belongs includes a plurality of source driver circuits.

The plurality of display blocks are arranged in a pixel row direction of the display panel, and each of the display blocks corresponds to at least one source driver circuit and is connected to the corresponding at least one source driver circuit.

In some embodiments, a quantity of the at least one second display block is 1. The timing control circuit 1201 is also configured to: determine a display block adjacent to the first display block and nearest to the pixel as a second display block.

In some embodiments, prior to performing the gamma correction, a difference value of actually measured brightness of the various pixels in each of the display blocks is less than a brightness threshold, and a difference value between actually measured brightness of any two pixels in two adjacent display blocks is greater than the brightness threshold.

In some embodiments, the plurality of display blocks are arranged in a plurality of rows and a plurality of columns.

Widths of the various display blocks in the same row are equal, and the widths of the display blocks are parallel to a pixel column extending direction of the display panel; and lengths of the various display blocks in the same column are equal, and the lengths of the display blocks are parallel to a pixel row extending direction of the display panel.

In some embodiments, any two of the plurality of display blocks are equal in length and equal in width.

In some embodiments, a quantity of the at least one second display block is 3. The timing control circuit 1201 is also configured to: determine a display block adjacent to the first display block in the pixel row extending direction of the display panel and nearest to the pixel as a second display block;

determine a display block adjacent to the first display block in a pixel column extending direction of the display panel and nearest to the pixel as a second display block; and determine a display block respectively adjacent to the second display block and the second display block as a second display block.

In summary, the embodiments of the present disclosure provide a method for driving a display panel. The driver circuit acquires gamma correction data of each of a plurality of display blocks, and the gamma correction data of the plurality of display blocks is acquired by performing gamma correction on at least one display block, such that the display panel is driven based on the gamma correction data of the various display blocks, and brightness of the display panel is ensured to be uniform.

Furthermore, a gamma voltage of each pixel is determined based on a position of the pixel, a first correction voltage, and a second correction voltage, such that luminance of adjacent pixels in a displaying process is ensured to be smoothly transitioned, and a relatively good displaying effect of the display panel is ensured.

The embodiments of the present disclosure provide a driver circuit for a display panel. The driver circuit includes: a memory, a processor, and a computer program stored on the memory and executable on the processor, wherein the processor, when executing the computer program, is caused to perform the method for driving the display panel according to the foregoing method embodiments, for example, the method for driving a display panel shown in FIG. 2 or FIG. 3.

Figure 12:
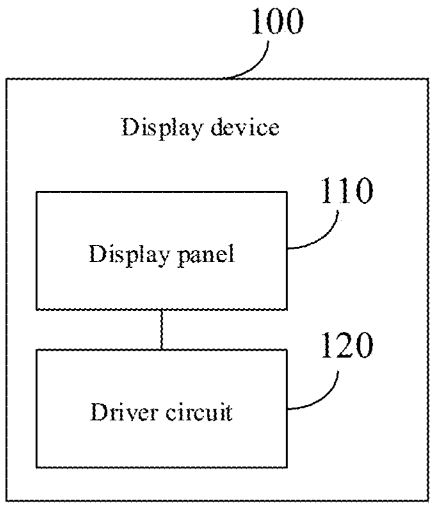
FIG. 12 is a schematic structural diagram of a display device according to some embodiments of the present disclosure.

The embodiments of the present disclosure provide a display device. Referring to FIG. 12, the display device 100 includes: a display panel 110, and a driver circuit 120 for the display panel according to the above embodiments.

In some embodiments, the display device is a vehicle-mounted display device (for example, a central control display screen) or a notebook computer. The display panel has a size greater than a size threshold (for example, 10 inches), and is an organic light-emitting diode (OLED) display panel.

The embodiments of the present disclosure provide a computer storage medium. The storage medium stores instructions, wherein the instructions, when loaded and executed by a processor, cause the processor to perform the method for driving the display panel according to the above method embodiments, for example, the method for driving the display panel shown in FIG. 2 or FIG. 3.

The embodiments of the present disclosure provide a computer program product. The computer program product includes computer instructions, wherein the instructions, when loaded and executed by a processor, cause the processor to perform the method for driving the display panel according to the above method embodiments, for example, the method for driving the display panel shown in FIG. 2 or FIG. 3.

It will be appreciated by those of ordinary skill in the art that all or a part of the steps for implementing the above embodiments may be completed by hardware, or may be completed by instructing relevant hardware by a program stored in a computer-readable storage medium. The storage medium mentioned above may be a read-only memory, a magnetic disk, an optical disk, or the like.

It should be understood that "and/or" mentioned herein indicates that three relationships may exist. For example, A and/or B may indicate that: only A is present, both A and B are present, and only B is present. The symbol "/" generally indicates an "or" relationship between the associated objects. Furthermore, the term "at least one" in the present disclosure means one or more, and the term "plurality" in the present disclosure means two or more.

In the present disclosure, the terms "first", "second", and the like are defined to distinguish the same or similar items with substantially identical functions and functionalities, and it should be understood that "first", "second", and "$n^{th}$" have no logical or sequential dependency relationship, and no limitation on the number or execution sequence. For example, without departing from the scopes of the various examples, the first gamma correction data is referred to as second gamma correction data, and similarly, the second gamma correction data is referred to as first gamma correction data.

Described above are merely exemplary embodiments of the present disclosure and are not intended to limit the present disclosure. Any modifications, equivalents, improvements, and the like, made within the spirit and principle of the present disclosure should fall within the protection scope of the present disclosure.

What is claimed is:

1. A method for driving a display panel, wherein the display panel comprises a plurality of display blocks; and the method comprises:

acquiring gamma correction data of each of the display blocks, wherein the gamma correction data of the plurality of display blocks is acquired by performing gamma correction on at least one of the plurality of display blocks;

for each pixel in the display panel, determining, based on the gamma correction data of a first display block where the pixel is located, a first correction voltage corresponding to a to-be-displayed target gray scale of the pixel;

determining, based on the gamma correction data of at least one second display block adjacent to the first display block, at least one second correction voltage corresponding to the target gray scale;

determining a gamma voltage of the pixel based on the first correction voltage, the at least one second correction voltage, and a position of the pixel in the display panel; and driving, based on the gamma voltage, the pixel to display the target gray scale;

wherein determining the gamma voltage of the pixel based on the first correction voltage, the at least one second correction voltage, and the position of the pixel in the display panel comprises:

acquiring a mapping relationship between correction voltages and positions of pixels by processing the first correction voltage, the at least one second correction voltage, a position of a central pixel of the first display block in the display panel, and a position of a central pixel of each second display block in the display panel based on a linear difference algorithm; and determining the gamma voltage of the pixel based on the position of the pixel in the display panel and the mapping relationship.

2. The method according to claim 1, wherein the gamma correction data is a voltage correspondence relationship between a gray scale and a gamma voltage; the first correction voltage and the at least one second correction voltage are both gamma voltages corresponding to the target gray scale; and determining the gamma voltage of the pixel based on the position of the pixel in the display panel and the mapping relationship comprises:

acquiring the gamma voltage of the pixel by substituting the position of the pixel in the display panel into the mapping relationship.

3. The method according to claim 2, wherein acquiring the gamma correction data of each of the plurality of display blocks comprises:

acquiring a voltage correspondence relationship between the gray scale and the gamma voltage of a target display block in the plurality of display blocks;

acquiring an offset correspondence relationship between the gray scale and a voltage offset of each of other display blocks in the plurality of displaying regions except the target display block, wherein the voltage offset corresponding to any gray scale in the offset correspondence relationship is an offset relative to the gamma voltage corresponding to the gray scale in the voltage correspondence relationship of the target display block; and for each of the other display blocks, acquiring a voltage correspondence relationship of the display block based on the offset correspondence relationship of the display block and the voltage correspondence relationship of the target display block.

4. The method according to claim 3, wherein a storage space occupied by the voltage offset is smaller than a storage space occupied by the gamma voltage.

5. The method according to claim 2, wherein acquiring the gamma correction data of each of the plurality of display blocks comprises:

acquiring display brightness of each of the plurality of display blocks; and acquiring the voltage correspondence relationship between the gray scale of the display block and the gamma voltage of each display block by performing gamma correction on the display block based on the display brightness of the display block.

6. The method according to claim 2, wherein acquiring the gamma correction data of each of the plurality of display blocks comprises:

acquiring a voltage correspondence relationship between the gray scale and the gamma voltage of a reference display block of a plurality of display blocks in a reference panel, and an offset correspondence relationship between the gray scale and a voltage offset of each of remaining display blocks of the plurality of display blocks of the reference panel except the reference display block, wherein the voltage offset corresponding to any gray scale in the offset correspondence relationship of the remaining display block is an offset relative to the gamma voltage corresponding to any gray scale in the voltage correspondence relationship of the reference display block;

acquiring display brightness of the target display block among the plurality of display blocks in the display panel, wherein the plurality of display blocks of the reference panel correspond to the plurality of display blocks of the display panel in a one-to-one manner;

acquiring the voltage correspondence relationship between the gray scale and the gamma voltage of the target display block by performing gamma correction on the target display block based on the display brightness of target display block; and for each of other display blocks in the display panel except the target display block, determining the voltage correspondence relationship of the display block based on the voltage correspondence relationship of the target display block and the offset correspondence relationship of the remaining display block corresponding to the display block.

7. The method according to claim 1, wherein the gamma correction data of a target display block in the plurality of display blocks is a voltage correspondence relationship between a gray scale and a gamma voltage, and an offset correspondence relationship between a gray scale and a voltage offset; the gamma correction data of each of other display blocks in the plurality of display blocks except the target display block is an offset correspondence between a gray scale and a voltage offset; and the voltage offset corresponding to any gray scale in the offset correspondence relationship is an offset relative to the gamma voltage corresponding to any gray scale in the voltage correspondence relationship of the target display block;

the first correction voltage and the at least one second correction voltage are both voltage offsets corresponding to the target gray scale; and determining the gamma voltage of the pixel based on the position of the pixel in the display panel and the mapping relationship comprises:

acquiring a voltage offset of the pixel by substituting the position of the pixel in the display panel into the mapping relationship; and determining the gamma voltage of the pixel based on the voltage offset of the pixel and the gamma voltage corresponding to the target gray scale in the voltage correspondence relationship.

8. The method according to claim 1, wherein the plurality of display blocks are arranged in an array.

9. The method according to claim 1, wherein a display device to which the display panel belongs comprises a plurality of source driver circuits;

the plurality of display blocks are arranged in a pixel row direction of the display panel, and each of the display blocks corresponds to at least one source driver circuit and is connected to the corresponding at least one source driver circuit.

10. The method according to claim 9, wherein a quantity of the at least one second display block is 1; and prior to determining at least one second correction voltage corresponding to the target gray scale based on the gamma correction data of the at least one second display block adjacent to the first display block, the method further comprises:

determining a display block adjacent to the first display block and nearest to the pixel as a second display block.

11. The method according to claim 1, wherein prior to performing the gamma correction, a difference value of actually measured brightness of the various pixels in each of the display blocks is less than a brightness threshold, and a difference value between actually measured brightness of any two pixels in two adjacent display blocks is greater than the brightness threshold.

12. The method according to claim 11, wherein the plurality of display blocks are arranged in a plurality of rows and a plurality of columns;

widths of the various display blocks in the same row are equal, and the widths of the display blocks are parallel to a pixel column extending direction of the display panel; and lengths of the various display blocks in the same column are equal, and the lengths of the display blocks are parallel to a pixel row extending direction of the display panel.

13. The method according to claim 12, wherein any two of the plurality of display blocks are equal in length and equal in width.

14. The method according to claim 12, wherein a quantity of the at least one second display block is 3; and prior to determining at least one second correction voltage corresponding to the target gray scale based on the gamma correction data of the at least one second display block adjacent to the first display block, the method further comprises:

determining a display block adjacent to the first display block in the pixel row extending direction of the display panel and nearest to the pixel as a second display block;

determining a display block adjacent to the first display block in the pixel column extending direction of the display panel and nearest to the pixel as a second display block; and determining a display block respectively adjacent to the second display block and the second display block as a second display block.

15. A non-transitory computer storage medium storing instructions thereon, wherein the instructions, when loaded and executed by a processor, cause the processor to perform the method for driving the display panel as defined in claim 1.

16. A computer program product, comprising computer instructions, wherein the instructions, when loaded and executed by a processor, cause the processor to perform the method for driving the display panel as defined in claim 1.

17. A driver circuit for a display panel, wherein the display panel comprises a plurality of display blocks; the driver circuit comprises a timing control circuit and a source driving module;

the timing control circuit is configured to:

acquire gamma correction data of each of the display blocks, wherein the gamma correction data of the plurality of display blocks is acquired by performing gamma correction on at least one of the plurality of display blocks;

for each pixel in the display panel, determine, based on the gamma correction data of a first display block where the pixel is located, a first correction voltage corresponding to a to-be-displayed target gray scale of the pixel;

determine, based on the gamma correction data of at least one second display block adjacent to the first display block, at least one second correction voltage corresponding to the target gray scale;

determine a gamma voltage of the pixel based on the first correction voltage, the at least one second correction voltage, and a position of the pixel in the display panel, and send the gamma voltage of the pixel to the source driving module; and the source driving module is configured to drive, based on the gamma voltage, the pixel to display the target gray scale;

wherein determining the gamma voltage of the pixel based on the first correction voltage, the at least one second correction voltage, and the position of the pixel in the display panel comprises:

acquiring a mapping relationship between correction voltages and positions of pixels by processing the first correction voltage, the at least one second correction voltage, a position of a central pixel of the first display block in the display panel, and a position of a central pixel of each second display block in the display panel based on a linear difference algorithm; and determining the gamma voltage of the pixel based on the position of the pixel in the display panel and the mapping relationship.

18. A display device, comprising: a display panel, and the driver circuit for the display panel according to claim 17.

19. A driver circuit for a display panel, comprising:

a memory, a processor, and a computer program stored on the memory and executable on the processor, wherein the display panel comprises a plurality of display blocks, and the processor, when executing the computer program, is caused to perform:

acquiring gamma correction data of each of the display blocks, wherein the gamma correction data of the plurality of display blocks is acquired by performing gamma correction on at least one of the plurality of display blocks;

for each pixel in the display panel, determining, based on the gamma correction data of a first display block where the pixel is located, a first correction voltage corresponding to a to-be-displayed target gray scale of the pixel;

determining, based on the gamma correction data of at least one second display block adjacent to the first display block, at least one second correction voltage corresponding to the target gray scale;

determining a gamma voltage of the pixel based on the first correction voltage, the at least one second correction voltage, and a position of the pixel in the display panel; and driving, based on the gamma voltage, the pixel to display the target gray scale;

wherein determining the gamma voltage of the pixel based on the first correction voltage, the at least one second correction voltage, and the position of the pixel in the display panel comprises:

acquiring a mapping relationship between correction voltages and positions of pixels by processing the first correction voltage, the at least one second correction voltage, a position of a central pixel of the first display block in the display panel, and a position of a central pixel of each second display block in the display panel based on a linear difference algorithm; and determining the gamma voltage of the pixel based on the position of the pixel in the display panel and the mapping relationship.

* * * * *